US010697848B1

(12) United States Patent
Dobbs et al.

(10) Patent No.: US 10,697,848 B1
(45) Date of Patent: Jun. 30, 2020

(54) SMART BUILDING WATER SUPPLY MANAGEMENT SYSTEM WITH LEAK DETECTION AND FLOOD PREVENTION

(71) Applicants: Kirk A. Dobbs, Pembroke (CA); Len Shankland, Petawawa (CA)

(72) Inventors: Kirk A. Dobbs, Pembroke (CA); Len Shankland, Petawawa (CA)

( * ) Notice: Subject to any disclaimer, the term of this patent is extended or adjusted under 35 U.S.C. 154(b) by 158 days.

(21) Appl. No.: 15/839,213

(22) Filed: Dec. 12, 2017

Related U.S. Application Data

(60) Provisional application No. 62/432,785, filed on Dec. 12, 2016.

(51) Int. Cl.
*G01M 3/28* (2006.01)
*F16K 31/02* (2006.01)
*E03B 7/07* (2006.01)

(52) U.S. Cl.
CPC ........... *G01M 3/2815* (2013.01); *E03B 7/071* (2013.01); *F16K 31/02* (2013.01); *Y10T 137/7761* (2015.04)

(58) Field of Classification Search
CPC . G01M 3/2815; E03B 7/071; Y10T 137/7761
See application file for complete search history.

(56) References Cited

U.S. PATENT DOCUMENTS

| 3,572,381 | A | * | 3/1971 | Nash | F04D 15/0209 |
| | | | | | 137/565.34 |
| 5,615,717 | A | * | 4/1997 | Cheiky | H01M 2/362 |
| | | | | | 137/260 |
| 5,708,193 | A | * | 1/1998 | Ledeen | G01M 3/243 |
| | | | | | 73/40 |
| 5,873,230 | A | * | 2/1999 | Wussmann | D01H 5/52 |
| | | | | | 19/236 |
| 5,913,236 | A | * | 6/1999 | Wodeslavsky | F24D 19/1006 |
| | | | | | 137/312 |
| 5,948,969 | A | * | 9/1999 | Fierro | G01M 3/2892 |
| | | | | | 73/40.5 R |
| 6,074,691 | A | * | 6/2000 | Schmitt | C23C 16/455 |
| | | | | | 137/551 |
| 6,363,958 | B1 | * | 4/2002 | Ollivier | G05D 7/0647 |
| | | | | | 137/2 |

(Continued)

*Primary Examiner* — William M McCalister
(74) *Attorney, Agent, or Firm* — Leslie R. J. Virany

(57) ABSTRACT

A logic-based building water supply management system having a minimal number of components to supply water on a qualifying-demand basis, thereby preventing major building flooding due to water plumbing leaks. The components are an electrically actuated valve downstream of the main building water supply valve, an accumulator tank immediately downstream of the valve, a tank pressure sensor, an electronic control module (ECM) and a manually operated bypass valve. The valve remains in a failsafe closed position unless a determination of qualifying demand is made. With the valve closed, all water flowing in the building may only come from the tank. As water flow stank, the measured tank supply pressure decays. The ECM compares the pressure decay rate to preprogrammed values so as to distinguish normal demand from a leak and takes appropriate action by opening the valve or disabling it from opening, and alarming, until a system reset is initiated.

7 Claims, 5 Drawing Sheets

(56) References Cited

U.S. PATENT DOCUMENTS

| | | | | |
|---|---|---|---|---|
| 6,634,598 B2* | 10/2003 | Susko | B64D 37/32 | 137/209 |
| 6,766,835 B1* | 7/2004 | Fima | F24H 9/2007 | 122/14.21 |
| 7,174,263 B2* | 2/2007 | Shajii | G01F 25/0038 | 702/100 |
| 7,461,549 B1* | 12/2008 | Ding | G01F 3/36 | 73/239 |
| 7,891,228 B2* | 2/2011 | Ding | G05D 7/0647 | 73/1.35 |
| 8,271,211 B2* | 9/2012 | Chung | G01F 1/34 | 137/2 |
| 8,826,935 B2* | 9/2014 | Nakada | G01F 1/00 | 137/486 |
| 2004/0261492 A1* | 12/2004 | Zarkar | G01F 25/0038 | 73/1.34 |
| 2006/0005882 A1* | 1/2006 | Tison | G01F 25/0038 | 137/487.5 |
| 2006/0123921 A1* | 6/2006 | Tison | G01F 7/005 | 73/861 |
| 2006/0278276 A1* | 12/2006 | Tanaka | G01F 1/6847 | 137/487.5 |
| 2007/0233412 A1* | 10/2007 | Gotoh | G01F 1/6847 | 702/100 |
| 2007/0240769 A1* | 10/2007 | Suzuki | G05D 7/0635 | 137/487.5 |
| 2009/0066524 A1* | 3/2009 | Yukawa | G01M 3/2815 | 340/605 |
| 2009/0112504 A1* | 4/2009 | Ding | G01F 22/02 | 702/100 |
| 2009/0183548 A1* | 7/2009 | Monkowski | G01F 25/0038 | 73/1.35 |
| 2010/0012026 A1* | 1/2010 | Hirata | C23C 16/4481 | 118/666 |
| 2010/0195991 A1* | 8/2010 | Deivasigamani | F24H 1/202 | 392/308 |
| 2010/0229967 A1* | 9/2010 | Yasuda | G01F 1/36 | 137/486 |
| 2010/0263882 A1* | 10/2010 | Bodemann | A62C 35/62 | 169/17 |
| 2011/0005250 A1* | 1/2011 | Perz | G05D 16/2013 | 62/222 |
| 2011/0108126 A1* | 5/2011 | Monkowski | G05D 7/0635 | 137/12 |
| 2013/0312834 A1* | 11/2013 | McLain | F02M 25/00 | 137/2 |
| 2014/0260513 A1* | 9/2014 | Smirnov | G01F 25/0007 | 73/1.34 |
| 2015/0211510 A1* | 7/2015 | Walsh | E03B 7/071 | 137/487.5 |
| 2016/0163177 A1* | 6/2016 | Klicpera | E03B 7/071 | 137/59 |
| 2017/0167026 A1* | 6/2017 | Nakada | C23C 16/52 | |
| 2017/0247863 A1* | 8/2017 | Kobayashi | E03B 7/003 | |

* cited by examiner

Valve 104 Timer T1
Subroutine #1

SMART BUILDING WATER SUPPLY MANAGEMENT SYSTEM WITH LEAK DETECTION AND FLOOD PREVENTION

BACKGROUND OF THE INVENTION

The prime objective of the present invention is to address the need for a simple, reliable and affordable solution to the all too common problem of building flooding due to plumbing leaks inside the structure. This "smart" water supply management system controls the water supply at the source, allowing water to flow only after verification that it is highly likely a leak does not exist, and even then, only for relatively short periods of time so major flooding cannot occur.

DESCRIPTION OF RELATED ART

Building flooding as a result of undetected leaks in the water supply system is widely recognized as a major problem, especially by insurance companies that pay out enormous amounts of money each year for repair costs due to water damage caused by internal plumbing leaks. To date this problem has clearly not been addressed in a manner that is acceptable to the buying public, in spite of the fact that there a large number of patents that have issued in the U.S. alone and there exists a number of products that are commercially available. Currently, products to reduce the risk of damage to property due to internal plumbing leaks left undetected range from simple products costing ten dollars or less that detect water on the floor in a local area and then sound an alarm, to elaborate whole house systems costing thousands of dollars. These products are categorized and described below, but what is important to note is that none appear to provide an acceptable level of risk mitigation for a reasonable price and therefore have not gained widespread acceptance. Hence the problem still exists. Most homes and commercial buildings are only protected against significant water damage via insurance policies. Flood damage claims are still second only to fire damage claims paid out by insurance companies and almost all flood damage claims relate to internal plumbing leaks. That is because insurance companies do not generally cover flood damage when the source of the water is external to the building, except under special circumstances.

Currently, commercially available products intended to mitigate, to one degree or another, the risk of water damage inside a building can be put into four main categories as follows:

Localized alarming sensors are devices that are placed on the floor in the direct vicinity of the device(s) in the home that pose the greatest threat of leakage such as hot water tanks, dishwashers, washing machines and the like. These inexpensive products sense spilled water and sound an audible alarm to alert occupants, and in some cases (the higher end ones) can tie into a security system and/or send the owner a message on their cellular phone. Such products range in price from less than ten dollars to a hundred plus dollars and are made by a large number of manufacturers. For completeness they are mentioned herein, but because they cannot disable the water supply, but rather just alarm/alert, they are not really pertinent to the present invention and as such will not be referred to again in this disclosure.

Localized sensors with shut-off capability are systems which use a water sensor in the vicinity of a single water using device, and a control unit that shuts off the water supply or power supply to the device when the sensor is exposed to water. These products range in price from around $150 and up and examples are sold under the trade names FloodStop for Hot Water Heaters and WaterCop Leak Stop.

Whole house sensor based systems with shut-off capability take protection to the next level by using a network of water sensors that are placed in the vicinity of water using devices in the building. The sensors are connected, either in a wired or wireless fashion, to a control unit which in turn is connected to an electrically actuated valve in the main water supply line of the building. When a sensor is exposed to water the control unit commands the electrically actuated valve to close. These systems are in the $500 and up range and examples are sold under the trade names WaterCop and WaterCop Pro.

Whole house flow based systems with shut-off capability are the highest end systems currently available. They do not respond to water being sensed on the floor, but rather detect and measure water flow in one fashion or another in an effort to determine whether the present water flow is normal (legitimate) demand in the house, such as someone taking a shower, or if it is abnormal demand that could be a leak. When the system's logic based control unit determines that it is highly likely that a leak is present, or simply after a predetermined length of time, the system's control unit disables the main supply of water by closing an electrically actuated valve. These products do provide a high level of risk mitigation, however, at a cost. They are on the order of $1500 and up for the system alone before installation and examples are sold under the trade names FloLogic and Leak Defense.

The prior art inventions that are pertinent to the present invention are listed and reviewed herein.

| U.S. Pat. No. | INVENTOR | ISSUE DATE |
| --- | --- | --- |
| 5,004,014 | Bender | Apr. 2, 1991 |
| 5,038,820 | Ames et al. | Aug. 13, 1991 |
| 5,240,022 | Franklin | Aug. 31, 1993 |
| 5,251,653 | Tucker et al. | Oct. 12, 1993 |
| 5,441,070 | Thompson | Aug. 15, 1995 |
| 5,967,171 | Dwyer, Jr. | Oct. 19, 1999 |
| 6,003,536 | Polverari et al. | Dec. 21, 1999 |
| 6,945,274 B1 | Davis | Sep. 20, 2005 |
| 7,032,435 B2 | Hassenflug | Apr. 25, 2006 |

In U.S. Pat. No. 5,004,014 Bender discloses a system that is "primarily designed to automatically detect, time and shut off a fluid flow after the expiration of a preset time." And in U.S. Pat. No. 5,038,820 Ames et al. disclose an "apparatus for automatically controlling the flow of fluid in an inlet conduit that supplies the water supply for a home or building so as to prevent water damage due to a failure in the water system when unattended". Although both the Bender invention and the Ames et al. invention use an electrically actuated valve that can disable the main water supply, their use is limited In U.S. Pat. No. 5,251,653 Tucker et al. disclose an invention that "is directed to a control system for automatically shutting off fluid flow in a fluid system responsive to the detection of leaks or unwanted fluid flow therein." However, a leak or unwanted flow is only detected when the system is "armed", such as when occupants are away or not expecting to need water. This invention appears to be quite impractical and unlikely to gain acceptance because it needs to be activated or armed otherwise it is not monitoring or performing any function. And in addition to being impractical, the suggested threshold for unwanted flow is on the order of 1 gallon per minute, which is excessively high and could result in hundreds of gallons of leaked water even in an overnight period if the leak was near the threshold.

U.S. Pat. No. 5,240,022 to Franklin, U.S. Pat. No. 5,655,561 to Wendel et al. and U.S. Pat. No. 5,967,171 to Dwyer, Jr. are similar inventions that disclose the use of one or more water sensors in communication with a control unit which can shut off a normally open electrically actuated valve in the main water supply line.

In U.S. Pat. No. 5,441,070 Thompson discloses an elaborate "Fluid Management System" which uses a normally closed valve, with power off, as its baseline state and only opens said valve when it senses what it has determined to a high degree of certainty that the demand is coming from an occupant or an appliance as opposed to a leaking fitting or broken pipe. This invention does provide for a comprehensive approach to water damage risk mitigation, however at a cost. The Thompson invention teaches the use "a plurality of flow sensors 60-74, one of which is located on each hot and cold water line supplying each water utilization device in the house i.e. each sink, dishwasher, tub, etc." From Thompson's patent—"FIG. 1 illustrates a fluid management system 200 of the present invention installed on a water supply system which is similar to that found in many homes today". That system uses 15 flow switches. Many homes and buildings would require far more than that. The FS-4 flow switches from Gems Sensors disclosed by Thompson were priced at $87 each on the Gems website in 2016.

In U.S. Pat. No. 6,003,536 Polverari et al. disclose an automatic shut-off valve system directed at individual water using appliances in a building. The system uses electrically actuated supply valves for both the hot and cold water supply to individual appliances that are maintained closed until the control unit senses that the appliance is on (current being drawn), at which time it opens said valves. It can also incorporate a floor mounted water sensor to close said valves as well. This invention has very limited capability, even though it uses an extensive number of electrically actuated valves and sensors, and cannot prevent flooding if the leak occurs in some part of the building where sensors are not present, such as a pipe in a wall.

In U.S. Pat. No. 6,945,274 B1 Davis discloses an invention that uses a remotely actuated valve that is immediately downstream of the main water supply valve in a building that is in a normally closed state, a timer control unit and a series of momentary contact switches located throughout the building at water use locations. The system is designed to supply water, when an occupant turns the switch on, for a time limited by the timer control unit after which time the remotely actuated valve returns to its normally closed state.

In U.S. Pat. No. 7,032,435 B2 Hassenflug discloses another elaborate invention which uses an electrically actuated valve that can be opened or closed on command, a main flow sensor located in series with said valve that can sense water flow being demanded by the building, a plurality of flow sensors located at each and every water using device in the building, and an electronic control unit. If there is flow sensed by the main flow sensor, but there is no corresponding signal from any localized sensors at the water using devices, then the system concludes that the demand is not normal or legitimate, therefore a leak, and thus the control unit commands the valve to a closed position and the system alarms. Although in principle this would seem like a system which would mitigate the flood risk in a very effective manner, the cost however of such a system would be prohibitive.

The conclusion to this prior art review is that there still remains a need for an affordable, easy to install water leak detection and management system that does not require a plurality of sensors, switches, wiring and the like located throughout the building and yet provides a high level of protection against serious water damage to a building.

BRIEF SUMMARY OF THE INVENTION

The present invention overcomes the above-noted problems of the prior art in at least the following respects. The present invention provides some monitoring and leak detection capability, in addition to the preset time feature so as to further reduce the risk of serious water damage. It is also desirable to have the electrically actuated valve in a normally closed state, with no power applied to it, unless there is what is considered to be normal (legitimate) demand as opposed to a leak. The present invention avoids the need for a battery backup system that adds complication and cost. The present invention provides a system that is constantly monitoring, i.e., armed essentially all of the time. It is also desirable to have a much lower limit on the volume of water that could be discharged to the building. it would be desirable to have a more encompassing system that can detect the unwanted discharge of water in locations where sensors are not present.

The present invention avoids the complication and cost of such a large number of sensors that could get clogged or otherwise fail to perform properly.

The present invention provides a system to protect the whole building from the unwanted discharge of water without the use of so many valves and sensors.

The present invention avoids the complication, cost and inconvenience to occupants of switches at each water using device throughout the building.

The present invention avoids the use of so many components in so many locations in the building. It should be noted that no system can reduce the risk of water damage to zero, so the key is to mitigate the risk to an acceptable level at an acceptable cost. The present invention strikes this balance, providing the greatest benefit to cost ratio, through its novel use of a minimum number of components, and its logic algorithms.

The present invention uses five components to monitor and manage the water supply system in a building in a safe and effective way, almost eliminating the risk of a major discharge of water into the building that could cause damage. Those components are 1) an electrically actuated valve (Valve) that is just downstream of the main building water supply valve, 2) an accumulator tank (also herein referred to as 'Tank') that is immediately downstream of the Valve, 3) a pressure sensor that monitors the Tank pressure, 4) an electronic control module (ECM) that is in direct communication with the Valve and pressure sensor and 5) a manually operated bypass valve The Valve has a normal state of being closed with no power applied to it and no demand for water from the building occupants or appliances. It opens in response to a command from the ECM when the pressure sensor measures a substantial drop in pressure, indicative of occupant or appliance demand. Under quiescent conditions, defined as no occupant or appliance demand, the Valve remains closed and thus, any demand for water by the building, be it a normal "inherent" leak (explained further in later text) or an actual leak, can only be satisfied by the available water in the Tank, because the whole building network of pipes and devices is isolated from the main supply source. Therefore, by monitoring changes in the Tank pressure the ECM can easily make accurate pressure decay measurements over time and those pressure decay rates are directly proportional to flow. Hence, this novel feature of the invention facilitates accurate flow measurements which can be characterized as normal and acceptable, or abnormal and unacceptable, by comparing the measurements to stored values. Through this simple analysis, the ECM can open or close the Valve accordingly, to prevent flooding, plus take other actions such as alerting the owner to a problem.

In operation, when an occupant or appliance in the building demands water, the ECM sees a very rapid drop in system pressure, due to the low volume of water available from the tank, and this rapid drop in pressure is deemed by the ECM to be actual, normal demand and therefore it commands the normally closed Valve to open to provide an uninterrupted supply of water. Simultaneously though, the ECM also initiates a timer such that the Valve can be commanded to close after a predetermined time, in case the demand is not normal but rather a substantial real leak such as a burst pipe, or alternatively, an occupant induced problem such as the overfilling of a sink or bathtub. This predetermined time is owner adjustable, both in length of time and time of day, and would typically be set in the range of 10-30 minutes, if the owner is home and in the range of 10-30 seconds if the owner is away (explained in detail in following sections). In day to day operation, wherein the demand is deemed normal, not exceeding the predetermined fault time, once the demand ceases, say when the occupant closes a faucet, and once the supply pressure has returned to its maximum value, as recognized by the ECM, the ECM commands the Valve to return to its normally closed state and resumes its constant monitoring task.

Further to the aforementioned inherent leaks in a building. It is commonly known that all building water supply systems lose a certain amount of water down the drain due to leaking devices such as faucets or toilet flapper valves. It is also well known that there can be a wide variation of inherent leak rates depending on the age, size and quality of the building plumbing system. But once the inherent leak rate of a particular system has been quantified, the ECM can be programmed accordingly such that it can distinguish, to a high degree of certainty, between such inherent leaks that pose no real threat, and real leaks that have damage potential. Any size of inherent leak will however result in the depletion of water stored in the Tank, and its pressure, thus the Tank needs to be periodically recharged so there is water available for the ECM to be able to perform its pressure decay measurements. During the quiescent state, when the Tank pressure falls to its preset minimum value, and the ECM has categorized this pressure decay rate as an inherent leak, the ECM commands the Valve to open to recharge the Tank back to the preset maximum pressure and then closes the Valve.

If, during the quiescent state, the ECM measures a flow rate from its pressure decay measurements that is in excess of what it recognizes as a normal inherent leak, but less than that indicative of normal demand, it goes through a process of confirming that this is a detected leak and commands the Valve to remain closed and alarms the owner. The Valve cannot open, until a reset is executed by the owner, thereby limiting the discharge of water, in many cases, to the small volume of water in the Tank and associated pipes. In the case of an actual hot water tank leak, without additional localized protection, it is true that the hot water tank could empty its contents on the floor of the building. However, this situation still only results in 40-60 gallons or so of discharged water, which will not likely cause widespread, costly damage.

DETAILED DESCRIPTION OF THE INVENTION

Figure 1:
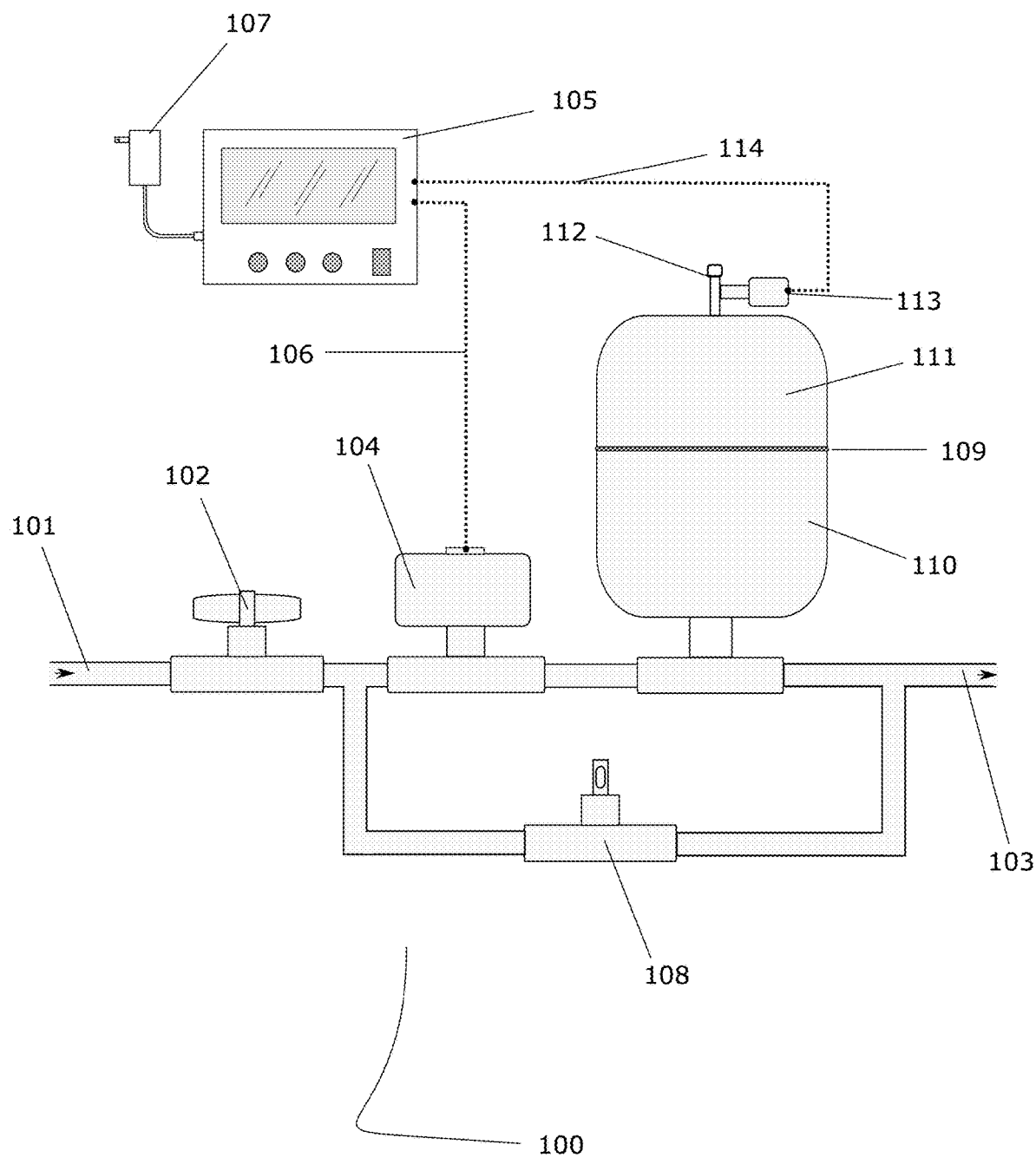
FIG. 1 Elements of preferred embodiments of the invention, including ECM, shutoff valve, electrically actuated valve, pressure sensor, accumulator tank and manual bypass valve.

FIG. 1 is a diagram of System 100, the preferred embodiment of the invention. The main water supply line 101 in homes and buildings usually has manually operated shutoff valve 102 that is normally left open to provide a pressurized source of water 103 to all of the water using devices in the building. In System 100, there is additionally an electrically actuated valve (Valve) 104 that is controlled by an electronic control module (ECM) 105 via a power lead 106. ECM 105 is plugged into a 115/230 VAC building receptacle 107. In the event of a prolonged power failure, a building occupant needs to open the manual bypass valve 108 to maintain a supply of water during the power outage. In another embodiment, the present invention is equipped with a backup battery to power the system for a certain length of power outage, provided the main water supply has not been interrupted by the outage. In any event, once power is restored the system automatically reverts to normal operation.

Further components of System 100 include an accumulator tank (Tank) 109, which has a water chamber 110 and an air chamber 111. The air is separated from the water via an expandable diaphragm, or contained in a balloon-like bladder. Either way, the end result is that as Tank 109 fills with water the contained air volume shrinks and its pressure increases, in direct proportion to the water pressure, until it reaches the maximum water supply pressure. Conversely, when Tank 109 is discharged, the water pressure and air pressure drop proportionally. Tank 109 can vary in size, but ideally is as small as possible for compactness and low cost. The air pre-charge pressure can vary too, depending on how much stored water is required. The relationship between air pre-charge pressure and stored water volume is proportional and linear. The lower the air pressure, the higher the volume of stored water. Tank 109 in the preferred embodiment System 100 has a total fluid volume of about 20 ounces. It stores about 18 ounces of water if the building water supply pressure is about 65 psi and the air pre-charge pressure is about 10 psi. These variables can be optimized from system to system to allow for smooth operation and accurate measurements. At the top of Tank 109 is a Schrader valve (like the stem valve on pneumatic tires) 112, which is used to control the air pre-charge pressure. Also connected to the air side of the Tank is a pressure sensor 113, that is connected via an electrical lead 114 to the ECM 105 where the system pressure is displayed. In an embodiment, the pressure sensor 113 is alternatively mounted directly on the ECM 105 printed circuit board, which might be more cost effective, and in that case the electrical lead would be presented with a very small air tube. Board mounted air pressure sensors, like those used on digital tire pressure gauges, and are very inexpensive, reliable and accurate enough for this application. It should be noted that of course a "wetted" pressure sensor could be used to monitor the water pressure directly. The reason to preferentially use an air pressure sensor is that air pressure sensors are less expensive and less prone to failure.

Figure 2:
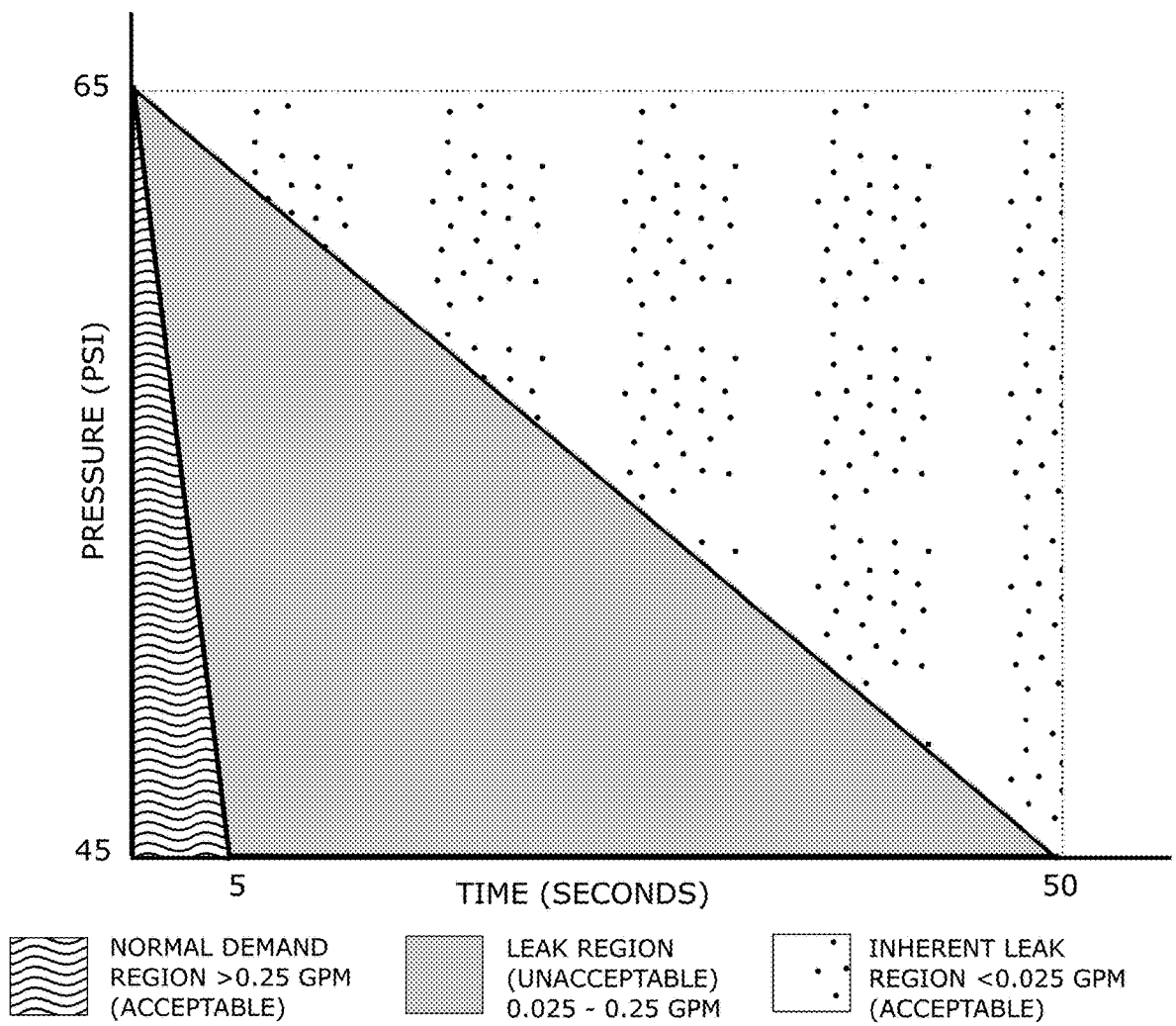
FIG. 2 Pressure decay rates used by ECM to determine an appropriate course of action.

FIG. 2 illustrates the pressure decay rate thresholds used by ECM 105 to determine an appropriate course of action. These pressure decay rates translate to flow rates as measured through experimentation using Tank 109 as described in System 100. The Normal Demand Region represents flow rates of about 0.25 U.S. gallons per minute (GPM) and higher. The Inherent Leak Region represents flow rates of 0.025 GPM and lower. The Leak Region represents all flow rates between those two thresholds. Although in reality the pressure decay curves are not linear as shown, they can be considered linear for the purpose of making flow rate measurements over a relatively small number of seconds. Because there could be water using devices in a building that operate on a flow rate less than 1 GPM, such as beverage makers, ice makers or humidifiers, the threshold of 0.25 GPM was chosen. There are no devices in a home or commercial building that use less than 0.25 GPM. Further, most buildings will not have an inherent leak rate above 0.025 GPM, as that would likely be noticed by occupants and rectified. It should be noted that these values are exemplary default values that, in embodiments, are altered upon installation to suit individual systems.

Figure 3:
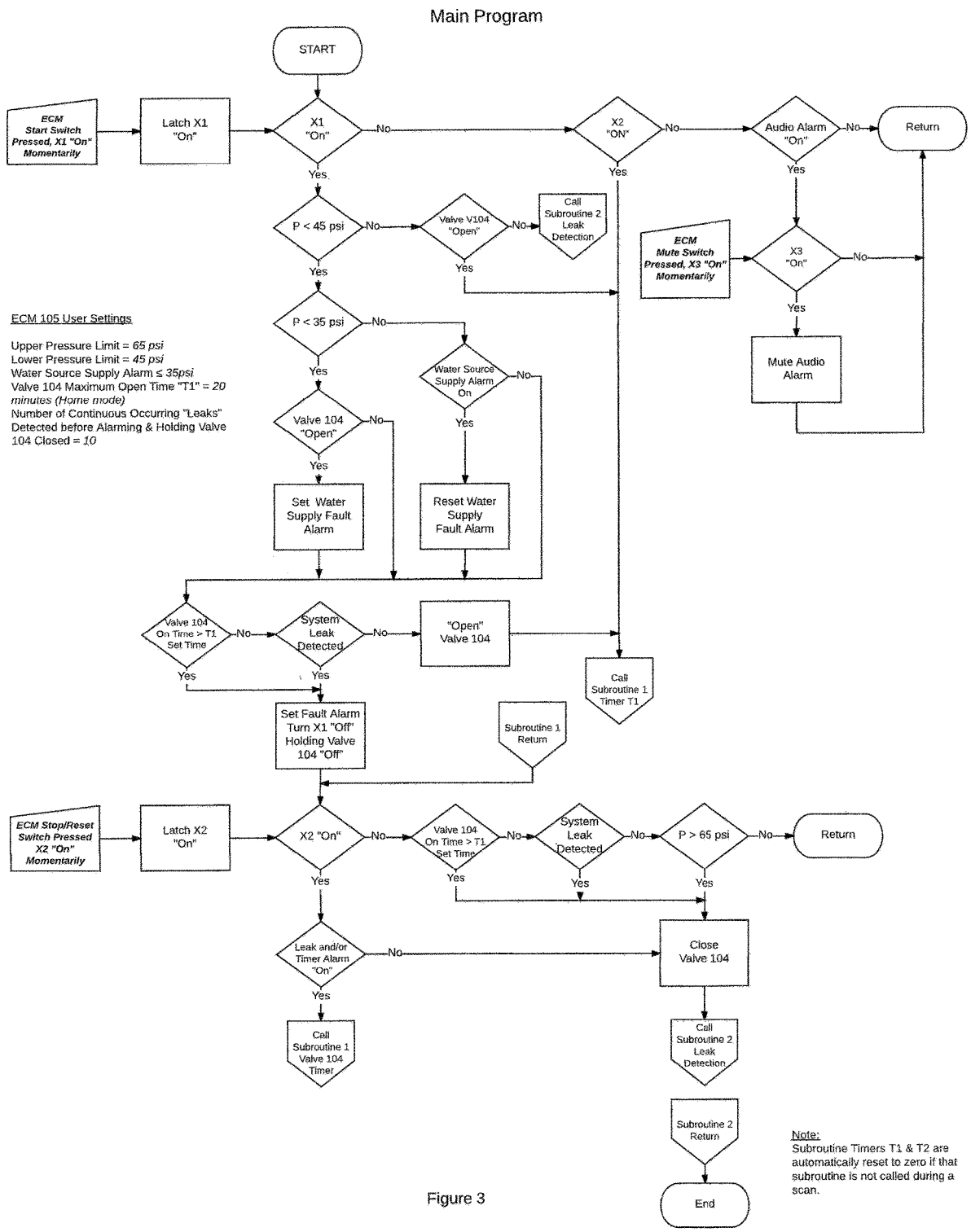
FIG. 3 Main program.
Figure 4:
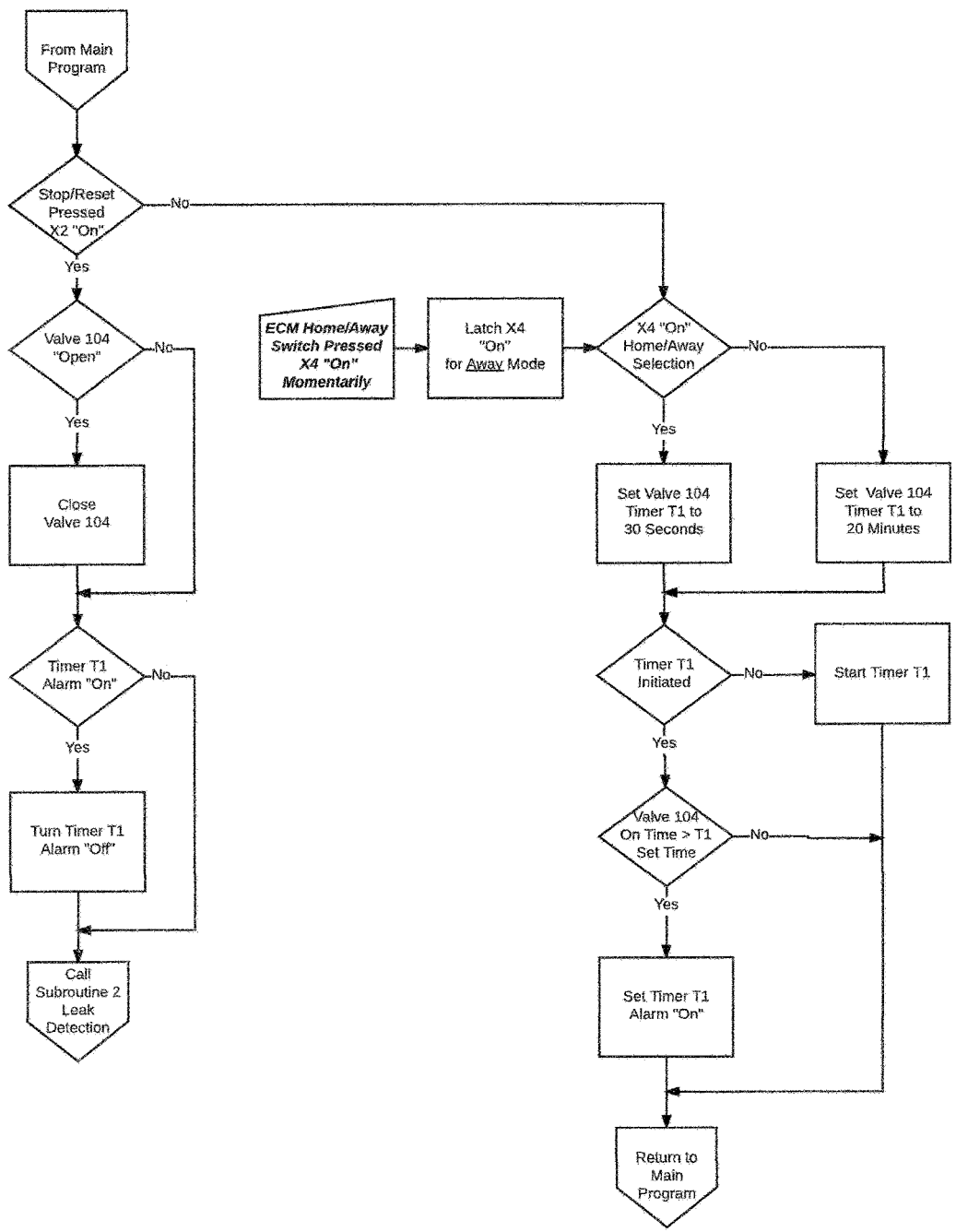
FIG. 4 Valve Timer: Subroutine #1.
Figure 5:
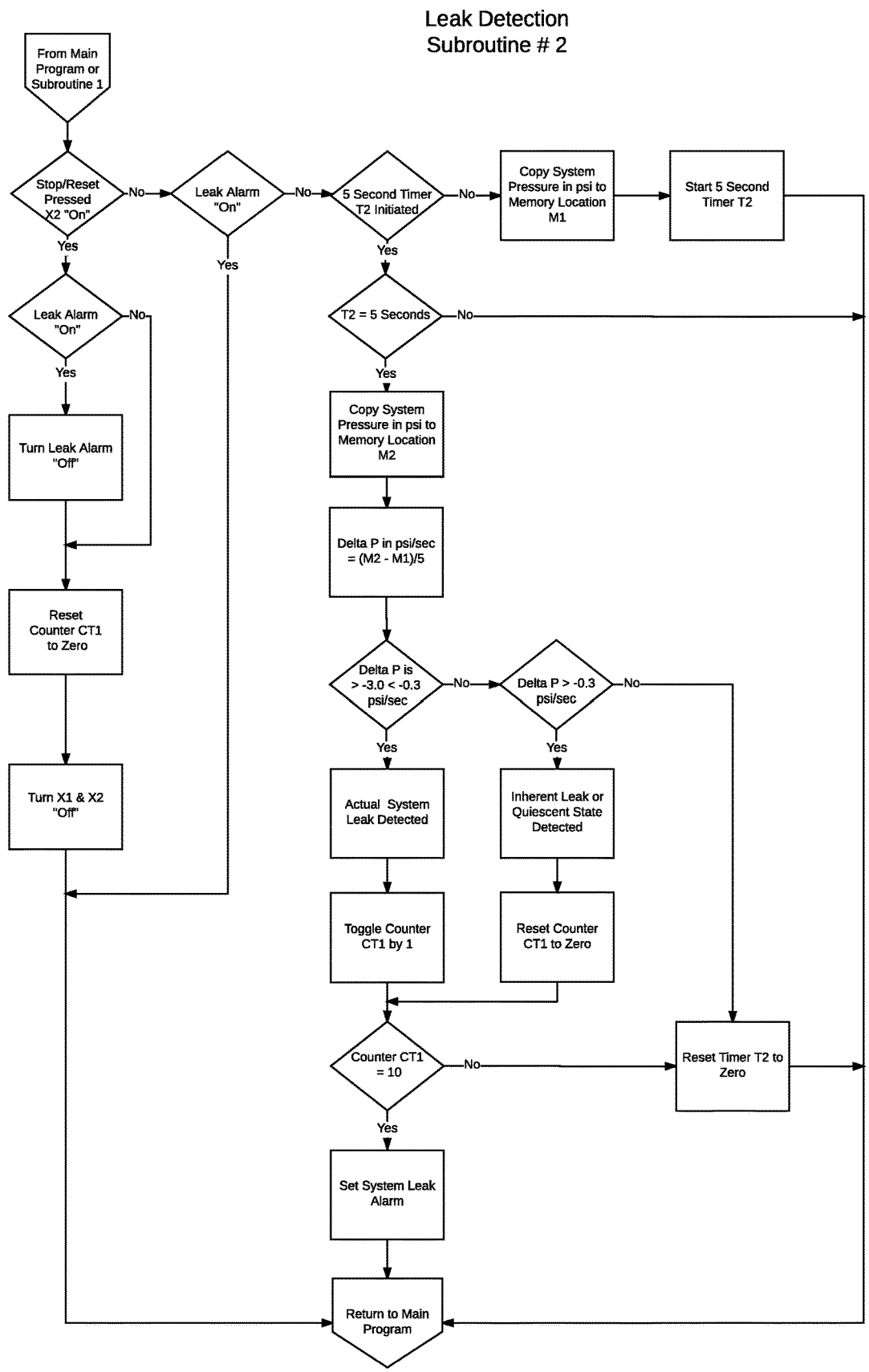
FIG. 5 Leak Detection: Subroutine #2.

FIGS. 3 through 5 are logic flow diagrams that show the calculations and decisions made by ECM 105. The job of ECM 105 is to constantly scan and monitor the changes in air pressure in Tank 109, and using preprogrammed, as well as owner/operator programmed threshold values of pressure and time, command Valve 104 to open or close as required. The Main Program is shown in FIG. 3 and the two supporting subroutine programs are shown in FIGS. 4 and 5. FIG. 4 is Subroutine #1 which is the program that monitors how long Valve 104 is allowed to stay open and FIG. 5 is Subroutine #2 which is the Leak Detection program.

The following variables can be adjusted by the owner/operator, within preset limits. The values in brackets are typical ones as used in the example described as System 100.
1. Maximum Pressure Limit (65 psi)
2. Minimum Pressure Limit (45 psi),
3. Loss of Water Supply Low Pressure Limit (35 psi),
4. Home or Away Mode
5. Valve 104 Maximum Open Time (20 minutes in Home Mode, 30 seconds in Away Mode)
6. Number of Repeated Leak Occurrences Required for an Alarm (10)

The Maximum Pressure Limit would typically be set by the owner a little less than the lowest observed main supply pressure, or lower if desired. For this example, the main supply pressure may fluctuate between 68 and 72 psi and so the setting of 65 psi is selected to ensure that Valve 104 will consistently close when commanded by ECM 105.

The Minimum Pressure Limit would typically be set about 20 psi below the Maximum Pressure Limit. This setting allows for almost constant flow when a device demands water and yet avoids the cycling of Valve 104 more than necessary.

The Loss of Water Supply Low Pressure Limit is incorporated to alarm the owner that their main supply pressure has fallen to an abnormally low level. This could occur say in a well supplied system if the pump or pump controller are failing or have failed. This function alerts the owner that they have a water supply problem and that their smart water management system will no longer function. This value would typically be set about 10 psi below the Minimum Pressure Limit.

The Home and Away Mode and Valve 104 Maximum Open Time are related variables. Home and Away Mode selection is done by toggling the Home/Away push button (see FIG. 4). This selection limits the Valve 104 Maximum Open Time (10-30 minutes in Home Mode and 10-30 seconds in Away Mode as mentioned earlier), and if exceeded results in a fault condition which will described again in the Operation of the Invention section as a Maximum Allowable Demand state. A Maximum Allowable Demand state will be triggered in the preferred embodiment System 100 if Valve 104 stays open longer than 20 minutes in the Home Mode or longer than 30 seconds in the Away Mode. The reason that Valve 104 is allowed to open at all in the Away Mode is two fold. Firstly, Valve 104 will need to open periodically to perform the Tank 109 recharge function, and secondly, there are devices in buildings that periodically require water even when unoccupied such as ice makers and humidifiers. Typically these devices can be satisfied within a 30 second limit.

The last variable is the Number of Repeated Leak Occurrences for an Alarm. ECM 105 uses this setting to better distinguish between actual legitimate brief low demand situations and an actual leak. By requiring ECM 105 to observe a significant number of "leak occurrences" before taking action, nuisance alarms are greatly avoided without increasing significant water damage potential. This owner adjustable variable could be viewed as a "leak detection sensitivity adjustment".

In System 100 operation the Main Program (FIG. 3) is initiated by first pushing the Stop/Reset button and then the Start button. In the absence of any fault conditions this only needs to be done once and the system remains activated. ECM 105 then continuously monitors the building's operating pressure, opening Valve 104 when it falls below 45 psi and closing it when a pressure of 65 psi is reached. Subroutine #1 (FIG. 4) comes into play when Valve 104 is open. Timer T1 in this subroutine starts and stops with the opening and closing of Valve 104 and an alarm is generated if the selected Valve 104 Maximum Open Time (20 minutes) is exceeded. As indicated above, this subroutine also accepts Home and Away settings from ECM 105 and facilitates timer alarm resets when called on by the Main Program.

Subroutine #2 (FIG. 5) is called by the Main Program any time Valve 104 is closed. At this point Tank 109 provides the only source of water. Timer T2 cycles from 0 to 5 seconds resets to zero and starts again. This repeats until the water pressure drops to 45 psi and Valve 104 opens recharging Tank 109. The water pressure, whether static or decreasing, is recorded at the beginning and end of each 5 second interval. ECM 105 then calculates the pressure drop over the 5 second period in psi/sec and from this determines if a Leak has occurred, an acceptable Inherent Leak exists, or the system is static and the pressure is constant. Subroutine #2 (FIG. 5) also comes into play when the Stop/Reset button is pressed, resetting counter CT1 and timer T2 to zero. Pressing the Stop/Reset button during normal operation immediately closes Valve 104 and puts ECM 105 in its inactive state until the Start button is pressed again.

Counter CT1 in Subroutine #2 (FIG. 5) counts each occurrence of a Leak and only takes action if there are 10 consecutive Leaks in a row. If the pressure is static or an Inherent Leak exists during the count, the counter is reset to zero and starts again. CT1's count is retained even when Valve 104 is cycling on and off due to a normal real demand for water. This means that a Leak will eventually be detected even if there is routine water use elsewhere in the house.

As mentioned earlier, the Main Program (FIG. 3) takes action disabling Valve 104 from opening if its ON time exceeds the preset Home or Away time or if a Leak occurs. At this point, ECM 105 alarms and displays the fault condition. Valve 104 cannot be opened, and monitoring ceases, until the owner/operator rectifies the problem and restarts the system by pressing the Stop/Reset button and then the Start button. The ECM 105 Mute Switch shown in FIG. 3 is used to turn the audio alarm off.

Operation of the Invention

The preferred embodiment, System 100, is best described in terms of its two modes of operation and the five conditional states, within each mode, that ECM 105 is programmed to recognize simultaneously. The two distinct modes are Home and Away and are set by the owner. The conditional states within both modes are referred to as, Normal Supply, Maximum Allowable Demand, Tank Recharge, Leak Detected and Loss of Water Supply states.

A Normal Supply state is characterized by a high water flow demand condition. In the Home mode this might typically be an occupant operating a faucet, or flushing a toilet etc. In the Away mode this could, for example, be an ice maker or a humidifier refilling its reservoir. In either mode, ECM 105 sees a very rapid drop in the system pressure, down to a preset trip point, in this example, around 45 psi. As a consequence, ECM 105 judges this to be a legitimate demand for water and responds by commanding Valve 104 to open. When demand ceases, as characterized by the system pressure building back up to its preset maximum of, in this example, around 65 psi, Valve 104 reverts to its normally closed position and ECM 105 resumes its monitoring duties. In the absence of any other recognized states, ECM 105 will continue to open Valve 104 each time the system pressure falls below 45 psi and close Valve 104 when the maximum 65 psi point is reached.

A Maximum Allowable Demand state occurs in System 100 when the preset allowable time of 20 minutes in Home Mode or 30 seconds in Away Mode is exceeded. When this happens ECM 105 commands Valve 104 to close and remain closed. Because this is a fault condition ECM 105 will not allow Valve 104 to open unless the fault is cleared with the Stop/Reset button and the system restarted with the Start button. Therefore, whether someone is home and left a faucet running, or no one is home and a real leak occurs, water cannot remain on for an extended period thereby avoiding major flooding.

A Tank Recharge state occurs when the system pressure has fallen down to the 45 psi point and ECM 105 recognizes this as a normal Inherent Leak rate and responds by recharging Tank 109 until the system pressure returns back to 65 psi, at which point Valve 104 is commanded to close. This system feature maintains an adequate volume of water in Tank 109 so that ECM 105 can perform its monitoring duties as required.

A Leak Detected state arises when ECM 105 has measured several occurrences of flow rates in the Leak Region of between 0.025 and 0.25 GPM. As mentioned earlier, the reason repeated occurrences are required is to avoid unnecessary nuisance false alarms. Some device in the building may experience a very brief low flow demand for water that could appear to ECM 105 to be a leak when in fact it is simply someone opening a faucet briefly, say when they are brushing their teeth, or filling a very small glass of water. They may even do this a few times in short order. In this type of scenario ECM 105 logs the occurrence but takes no immediate action. After a number of "suspect leak" occurrences such as this, 10 in the case of System 100, within a short period of time, ECM 105 decides this is a Leak Detected state and disables Valve 104 and alarms a fault condition. Because this is a fault condition ECM 105 will not allow Valve 104 to open unless the fault is cleared through a system reset and restarted.

A Loss of Water Supply state occurs if the system pressure ever drops below the Loss of Water Supply Pressure Limit of 35 psi. This is a fault/alarm condition and as such requires owner intervention to rectify the problem, clear the fault and restart the system.

Although this covers the fundamental operation of the invention, it should be noted that it may be preferable to incorporate additional features into the system of the present invention through more sophisticated programming of ECM 105. For example, in an embodiment, ECM 105 is programmed to "learn" the Inherent Leak Rate over time and make adjustments to the preset threshold if necessary, within reasonable limits. In an embodiment, after an initial learn process, say a couple of days after the system is commissioned, ECM 105 adjusts the preset threshold of 0.025 GPM to increase the degree of certainty of leak detection. In further embodiments, ECM 105 displays the average measured Inherent Leak Rate updating the value on a daily basis. This feature not only improves the leak detection accuracy, but would alert owners to worsening conditions, such as leaky faucets or toilets, so that they could initiate maintenance or repair measures, thereby saving water.

In embodiments, additional features built into the system include the ability for ECM 105 to be programmed to accommodate lawn irrigation systems and water conditioning systems if their demand time exceeds that desired as a Maximum Allowable Demand time. Also, ECM 105 could be connected to the internet and other devices such as smart phones, home computers, home automation controllers and security systems. This allows owners to be able to monitor the system status, or to be alerted to a fault condition, essentially from anywhere.

Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

What is claimed is:

1. A system for distribution of a fluid to a structure comprising:
    a logic-based electronic control module
    an electrically-actuated valve having a normally closed state and connected, upstream, to a main fluid supply and, downstream, to a distribution system for the structure
    a sealed accumulator tank connected downstream to said electrically actuated valve, said tank being partially filled with said fluid
    a pressure sensor connected to said tank,
    said electronic control module being in communication with the pressure sensor and the electrically actuated valve;
    the electronic control module programmed to:
        determine, based on input from said pressure sensor, a flow rate of the fluid to the distribution system for the structure
        determine whether said flow rate of the fluid represents an acceptable fluid demand condition;

cause the electrically actuated valve to open if said determination of an acceptable fluid demand condition is positive wherein;

said fluid is water; and said accumulator tank further comprises a flexible member separating a water-filled region from an air-filled region.

2. The system for distribution of claim 1 wherein said flexible member consists of an expandable diaphragm or balloon-like bladder.

3. The system for distribution of claim 1 further comprising a manual bypass valve.

4. The system for distribution of claim 1 further comprising a backup battery.

5. The system for distribution of claim 1 electrically actuated valve consists of a Schrader valve or stem valve.

6. The system for distribution of claim 1 wherein said tank contains a total fluid volume in a range between 18 and 20 ounces.

7. The system for distribution of claim 1 further comprising an alert in the event that a determination is made that said demand flow rate fails to represent an acceptable condition.

* * * * *